United States Patent [19]

Vincent et al.

[11] 4,369,112
[45] Jan. 18, 1983

[54] FILTER DEVICE

[75] Inventors: Monty E. Vincent; Robert E. Corbett, both of Ann Arbor, Mich.

[73] Assignee: Gelman Sciences Inc., Ann Arbor, Mich.

[21] Appl. No.: 244,849

[22] Filed: Mar. 18, 1981

[51] Int. Cl.³ .............................................. B01D 31/00
[52] U.S. Cl. .................................. 210/433.2; 210/446; 210/454; 210/456
[58] Field of Search ........................ 55/483, 484, 492; 210/486, 346, 456, 927, 454, 461, 433.2, 446

[56] References Cited

U.S. PATENT DOCUMENTS

| | | | |
|---|---|---|---|
| 3,441,143 | 4/1969 | Kudlaty | 210/486 X |
| 3,501,010 | 3/1970 | Critchell et al. | 210/346 X |
| 4,021,353 | 5/1977 | Raines et al. | 210/446 X |
| 4,212,742 | 7/1980 | Solomon et al. | 210/456 X |
| 4,242,203 | 12/1980 | Amicel et al. | 210/456 |
| 4,294,594 | 10/1981 | Sloane, Jr. et al. | 210/446 X |
| 4,304,670 | 12/1981 | Watanabe et al. | 210/446 |

Primary Examiner—Frank A. Spear, Jr.
Attorney, Agent, or Firm—Reising, Ethington, Barnard, Perry & Brooks

[57] ABSTRACT

The filter device has a housing with elongated top and bottom walls and side walls which taper inwardly from top to bottom. The top wall has extending downwardly therefrom into the housing a generally flat filter membrane support with a quadrangular periphery, a pair of filter membranes being disposed on opposite sides of the support and sealingly bonded to its periphery, the support having a center portion with spaced coplanar surfaces on each side to provide support for the center portion of the filter membranes. The housing is provided with an opening communicating with the space between the two filter membranes and with an opening communicating with the space between the housing and the two membranes. The bottom wall and side walls of the housing are in the form of a unitary molding of organic polymeric material open at its upper end, and the top wall and the downwardly extending filter membrane support is formed of another molding of organic polymeric material bonded about the periphery of the top wall into the open end of the outer molding. Because of such structure the device can be manufactured at relatively low cost and is compact while yet affording a large filtering area.

5 Claims, 3 Drawing Figures

FILTER DEVICE

TECHNICAL FIELD

This invention relates to a filter device of the type incorporating two filter membranes of equal surface area bonded to the oppositely disposed sides of a support member disposed within a housing, the housing having one fluid opening which communicates with the space between the two filter membranes and another opening which communicates with the space between the housing and the assembly of the two membranes and the support.

BACKGROUND ART

Filter devices of a general type incorporating two filter membranes of equal size on oppositely disposed sides of a membrane support are well known in the art as shown, for example, by U.S. Pat. No. 3,730,353. The purpose of using the two filter membranes, instead of only one, is to double the available filtration area without commensurate increase in the size of the filtration device. However, such filter devices have heretofore consisted of assemblies of three or more components, in addition to the two filter membranes, and at that with the geometry of the components and assemblies being such as to involve difficulties and expense in manufacture without compensating increase in filtration performance or effective filter life.

The objective realized by the present invention is a compact filter device which provides the desired increased filtration surface area by the incorporation of two membranes and which can be manufactured at relatively low cost using, in addition to the two membranes, only two components, each a plastic molding, which can be readily bonded together.

DISCLOSURE OF INVENTION

The filter device of the present invention comprises a housing having elongated top and bottom walls and side walls which taper inwardly from top to bottom. In the preferred embodiment each of the top and bottom walls is of generally rectangular shape with a length more than four times its width and all of the side walls, four in number, are generally trapezoidal shaped, two opposed side walls being relatively narrow and the other two opposed side walls being flat and relatively wide whereby the housing is of a generally flat shape but with all of the side walls tapering from top to bottom thereof.

The top wall has extending downwardly therefrom into the housing a generally flat filter membrane support with a quadrangular periphery which is spaced from the bottom wall and from the side walls, the pair of filter membranes being sealingly bonded to the periphery of the support, one on each side thereof, the support having a center portion with a plurality of spaced coplanar surfaces on each of the two sides thereof adjacent the two filter membranes thereby to provide support for the center portions of the filter membranes. In the preferred embodiment the coplanar surfaces on each side of the support center portion are in the form of elongated ribs on a thin plate which connects to the periphery of the support, the ribs extending in a direction from top to bottom of the support.

The housing is provided with an opening which communicates with the space between the housing and the assembly of the two membranes and the membrane support, and an opening through the top wall and through the periphery of the support which communicates with the space between the two filter membranes. In the preferred embodiment the thin plate with the ribs thereon which forms the center portion of the support has an upper end which is spaced from the portion of the support periphery through which the top wall opening extends thereby forming a header which provides communication between the opening and the spaces between the elongated ribs on the thin plate.

Further and in accordance with the preferred embodiment of the invention, the bottom wall and all of the side walls of the housing are in the form of a unitary molding of organic polymeric material, such molding being open at its upper end, and the top wall with its downwardly extending filter membrane support is formed by a second molding of organic polymeric material, this second molding being sealingly bonded about the periphery of the top wall into the opening at the upper end of the other plastic molding after the filter membranes have been bonded to the filter membrane support. Hence, other than the two filter membranes, only two components, each a relatively inexpensive plastic molding, are required. Particularly by reason of the tapered shape of the molding which provides the bottom and side walls of the housing, it can be molded with relatively little trouble and expense. Still further, in the preferred embodiment the top wall is provided with an additional fluid opening or openings which communicate with the space between the housing and the assembly of the filter membranes and the filter membrane support. The tapered shape of the housing provides sufficient spacing between the housing side walls and the assembly, at the top of the housing, to permit such additional openings at that location without there being wasted space in other portions of the device. These and other features and advantages of the invention will be more apparent from the detailed description of the preferred embodiment which follows hereinafter.

BEST MODE FOR CARRYING OUT THE INVENTION

Figure 1:
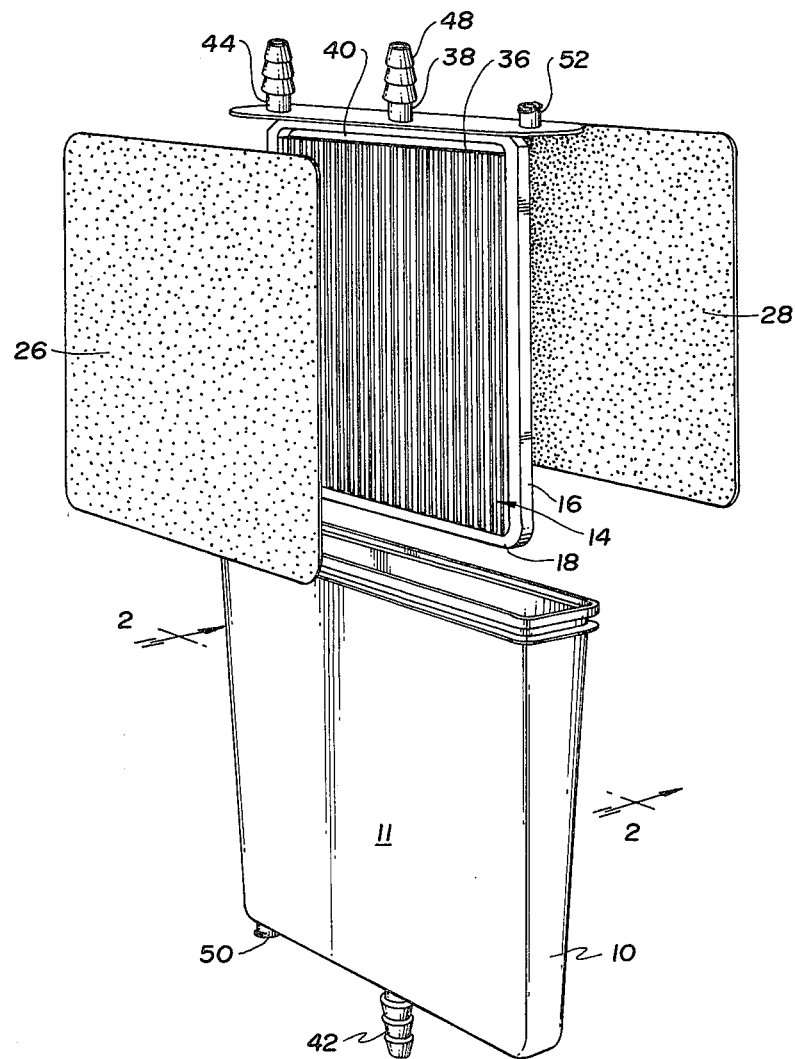
FIG. 1 is an exploded perspective view of the preferred embodiment of the invention.
Figure 2:
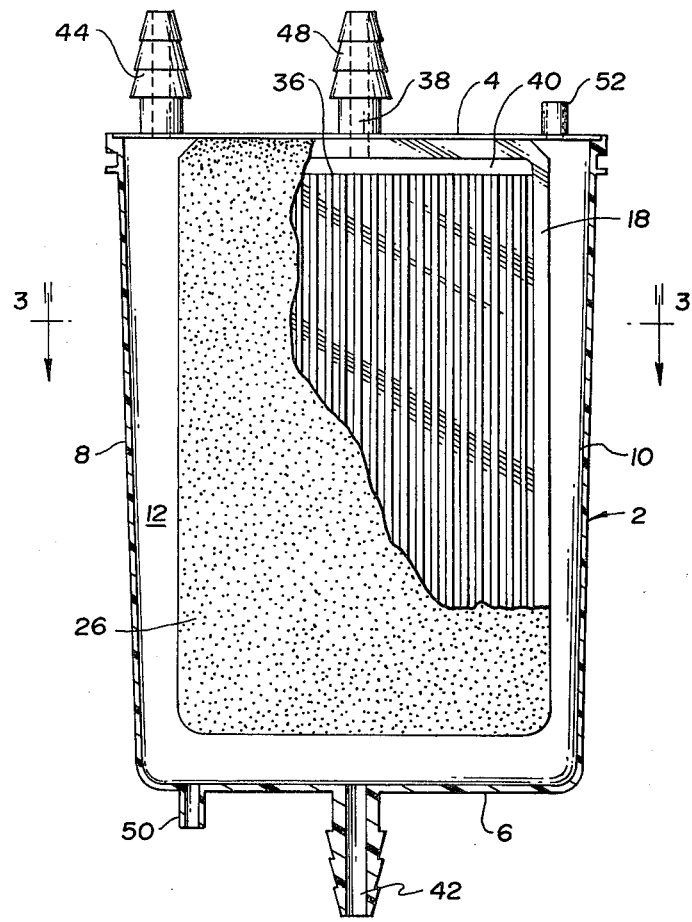
FIG. 2 is a side view in section, and with parts broken away, of the embodiment shown in FIG. 1, but in completely assembled form.

Referring now to the drawings, the preferred embodiment shown comprises a housing 2 having an elongated, rectangular-shaped top wall 4 the length of which is more than four times the width, an elongated, rectangular-shaped bottom wall 6 also having a length more than four times its width, the length and width of the bottom wall being less than the length and width, respectively, of the top wall. The housing has a pair of opposed side walls, 8 10, which are of trapezoidal shape and relatively narrow, and a pair of opposed side walls, 11 and 12, which are also of trapezoidal shape and which are flat and relatively wide, all of these side walls connecting to each other and to the top and bottom walls whereby the housing has a substantially flat shape but tapered from top to bottom on all sides thereof.

Figure 3:
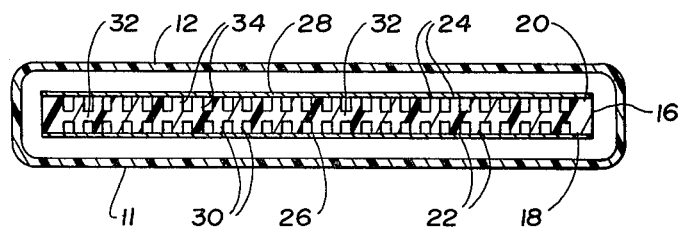
FIG. 3 is a sectional view taken on the line 3—3 of FIG. 2.

The top wall 4 has extending downwardly therefrom into the housing a filter membrane support 14 which is spaced from the bottom wall and the side walls of the housing. This support has a quadrangular peripheral portion 16 each of the oppositely disposed lateral sides of which is a continuous planar surface, one of these continuous planar surfaces being shown at 18 and the other being shown at 20 (see FIG. 3). The center portion of the filter membrane support has a plurality of surfaces 22 on one side thereof which are coplanar with each other and, on the other side thereof, another plurality of surfaces 24 which are coplanar with each other.

A filter membrane 26 is bonded about its periphery to the continuous planar surface 18 of the peripheral portion of the support, the center portion of the filter membrane 26 being supported, during use of the device, by the coplanar surfaces 22. A second filter membrane 28, which is identical in shape to the filter membrane 26, is bonded about its periphery to the continuous planar surface 20 of the periphery of the support, the center portion of the filter membrane 28 being supported, during use of the device, by the coplanar surfaces 24. The top wall 4 has a fluid opening 38 which extends therethrough and through the peripheral portion 16 of the support and hence into communication with the space between the filter membranes. The coplanar surfaces 22 are spaced from each other, and likewise the coplanar surfaces 24 are spaced from each other, so as to allow fluidflow therebetween and hence between and in contact with the filter membranes. In the preferred embodiment shown the peripheral portion 16 of the support is rectangular and the surfaces 22 are provided by a plurality of equally spaced, elongated ribs 30 which extend in a direction from top to bottom of the support and which are formed on a thin plate 32 which connects to the bottom and sides of the peripheral portion 16 of the support, the surfaces 24 being provided by a like plurality of elongated ribs 34 likewise extending in a direction from top to bottom of the support and formed on the other side of the thin plate 32. The plate 32, with the ribs 30 and 34 formed thereon has an upper end 36 which is spaced from the portion of the periphery 16 through which the opening 38 extends, thereby providing a header between the opening 38 and the spaces between the ribs 30 and between the ribs 34 thereby to provide fluid flow between the filter membranes and to or from the opening 38.

The housing must be provided with at least one opening for fluid flow into, or from, the space between the housing and the assembly of the two filter membranes and the filter membrane support and, in the preferred embodiment shown, the housing is provided with two such openings, opening 42 which is through the bottom wall 6 and opening 44 which is through the top wall 4 at the side thereof adjacent the wall 8. The provision of the two openings 42 and 44 enables the fluid inlet and fluid outlet connections both to be made at the top of the device, by using openings 38 and 44, or with one connection being made at the top and the other connection being made at the bottom of the device by using openings 38 and 42. Whichever of opening 42 and 44 is not used can be plugged. All of the openings 38, 42 and 44 are provided with a stepped cone exterior surface, as shown at 48, for ease in the securement of elastomeric tubing. Additionally, the housing of the preferred embodiment shown is provided with an opening 50 through its bottom wall and an opening 52 through its top wall, each of which openings communicates with the space between the housing and the assembly of the filter membranes and the filter membrane support. These openings 50 and 52 are to enable the escape of air or other gas while the device is in use for filtering a liquid, the opening in use for this purpose being provided with a hydrophobic filter, not shown, and the other of the openings, not in use, being plugged. The choice of the opening 50 or 52 to be used for the escape of air or other gas, if such escape is desired, depends on the orientation of the device during use, the escape opening for the air or other gas always being positioned on top of the device in its orientation as used.

In use, the liquid to be filtered flows into the housing through either opening 42 or 44, through the filter membranes into the space therebetween and then out through opening 38. The coplanar surfaces on each side of the support in the center portion thereof support the filter membranes and maintain the spacing therebetween.

In this preferred embodiment, the bottom wall 6 and all of the side walls 8 and 10 and 11 and 12 of the housing are in the form of a unitary molding of organic polymeric material, such molding being open at its upper end as shown in FIG. 1. The top wall 4 with its downwardly extending filter membrane support 14 is formed by a second unitary molding of organic polymeric material, again as best seen in FIG. 1, the top wall being bonded and sealed about its periphery into the upper open end of the other molding. The open upper end of the molding which forms the bottom and side walls of the housing is preferably formed with a continuous groove 58 around its periphery for reception of the periphery of the top wall 6. The top wall 6 is, of course, bonded to the open upper end only after the membranes are sealingly bonded to the support.

Hence, the structure enables manufacture of the device using, in addition to the two filter membranes, only two components, each a unitary plastic molding, which can be readily bonded together in sealed relationship. Where the organic polymer used is thermoplastic, as is preferred, heat bonding and sealing can be used, just as for bonding and sealing the filter membranes to the support—though bonding and sealing with an adhesive can be used if desired.

In the particular embodiment shown the actual dimensions of the support, within its peripheral portion are: length about 12.5 cm., width about 8 cm. This provides about 200 sq. cm. of filtering area, the external dimensions, i.e. of the housing exclusive of the tube fittings, being: length about 14.5 cm., width at center about 10.5 cm., thickness at center about 1.5 cm. Hence the device is compact while yet providing a large filtering area.

The filter membrane used can be as desired though for most uses of the device the requirement is for microporous membrane and it is preferred that the membrane be of organic polymer particularly for ease in sealing and bonding. The organic polymer used for the moldings should preferably be a thermoplastic, polypropylene being typical.

It will be understood that while the invention has been described specifically by reference to a preferred embodiment thereof various changes and modifications can be made all within the full and intended scope of the claims which follow.

What is claimed is:

1. The filter device comprising a housing with elongated top and bottom walls and side walls which taper inwardly from top to bottom, said top wall having extending downwardly therefrom into the housing a generally flat filter membrane support with a quadrangular periphery, a pair of filter membranes being disposed on opposite sides of the support and sealingly bonded to its periphery, the support having a center portion with spaced coplanar surfaces on each of the two sides thereof adjacent the filter membranes to provide support for the center portions of the filter membranes, said top wall having an opening which extends through the periphery of the support and communicates with the space between the two filter membranes, and said top wall having at least one opening adjacent a side wall of the housing communicating with the space between the housing and the two membranes, the bottom wall and side walls of the housing being in the form of a unitary molding of organic polymeric material open at its upper end, and the top wall and the downwardly extending filter membrane support being formed of another molding of organic polymeric material bonded about the periphery of the top wall into the open end of the other molding.

2. A filter device as set forth in claim 1 wherein the periphery of said support is rectangular and wherein the coplanar surfaces on each of the sides of the center portion of the support are elongated ribs extending in a direction from top to bottom of the support and formed on a thin plate which connects to the periphery of the support, said thin plate having an upper end which is spaced from the portion of the support periphery through which said first mentioned opening extends.

3. A filter device as set forth in claim 1 wherein each of said elongated top and bottom walls is of generally rectangular shape with a length more than four times its width, two opposed side walls of the housing being relatively narrow and the other two opposed side walls of the housing being flat and relatively wide.

4. A filter device as set forth in claim 3 wherein the opening in said top wall communicating with the space between said housing and the two membranes is adjacent one of the opposed relatively narrow side walls, and wherein said housing has an opening through the bottom wall thereof communicating with the space between said housing and the two membranes.

5. A filter device as set forth in claim 4 wherein said top wall has a third opening therethrough, said third opening communicating with the space between the housing and the two membranes and being adjacent the other of the opposed relatively narrow side walls of the housing, and wherein the bottom wall has a second opening therethrough communicating with the space between the housing and the two filter membranes.

* * * * *